United States Patent Office 3,073,157
Patented Jan. 15, 1963

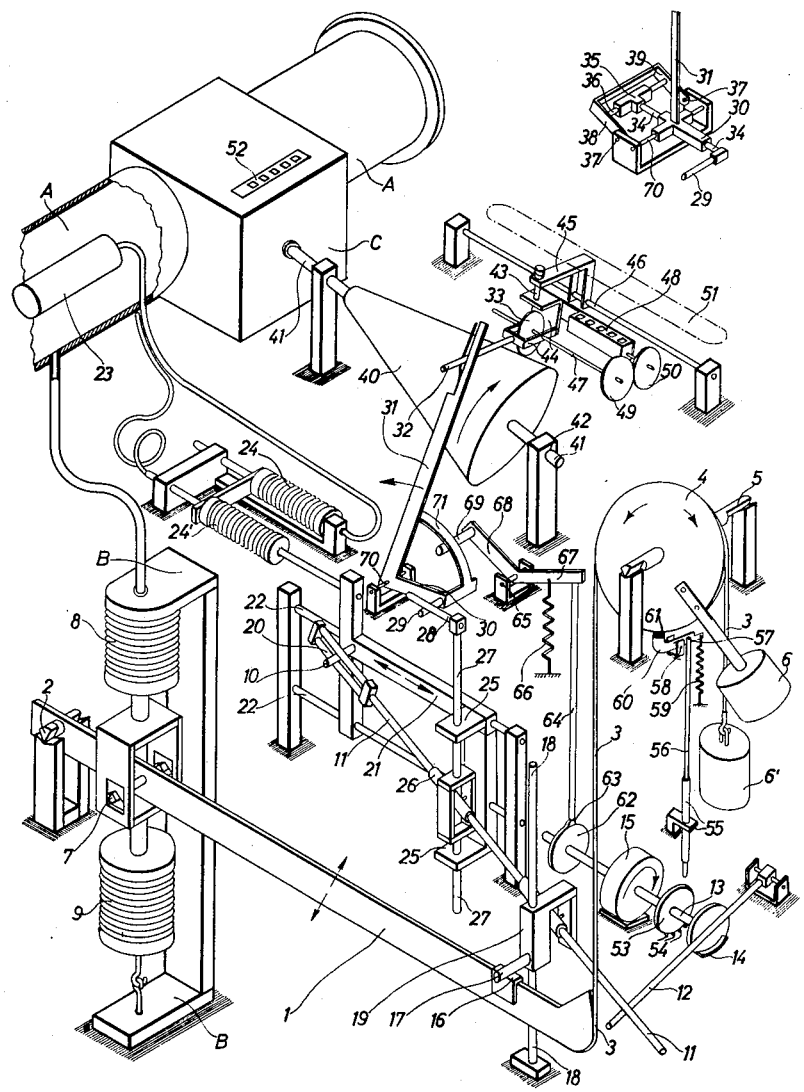

3,073,157
PRESSURE AND TEMPERATURE COMPENSATOR FOR A GAS METER
Hans Gehre, 63 Bernhardstrasse, Oberkassel, Siegkreis, Germany
Filed Feb. 10, 1958, Ser. No. 714,272
Claims priority, application Germany Feb. 8, 1957
6 Claims. (Cl. 73—194)

The present invention relates to a device for volume reduction or correction for use with a meter for the measurement of gases flowing in pipelines, that is, to a device for referring gas volumes measured at any existing state to selected or normal conditions.

A method is already known in which the correction factor Z is produced by a mechanical computing device on the basis of the gas equation of state from the measured influence quantities, transformed into equivalent geometrical values, used as the setting movement for a variable intermediate drive (reduction gear, summing mechanism or the like) provided in the counting mechanism drive of the gas meter.

In a known device operating according to this method (see British patent specification No. 742,648 and U.S. Patent 2,861,453), the quantities to be made effective on the computing mechanism are, on the one hand, the sum of the service gauge pressure $p_u$ of the gas to be measured and the barometric reading $ba$ or the difference between this gauge pressure $p_u$ and an auxiliary pressure $p_u^+$ in functional relation with the barometric reading and, on the other hand, the quotient of the thermometer indication and the absolute temperature, wherein the mechanical conversion is effected according to the equation:

$$Z = \frac{(ba + p_u)}{p_o} \cdot (1 - R)$$

or $$Z = \left(1 + \frac{p_u - p_u^+}{p_o}\right) \cdot (1 - R)$$

derived from the gas equation of state by serial expansion. In the above equations, $p_o$ represents the measurement state pressure and R represents the relation $$\frac{\delta}{T}$$

wherein $\delta$ is the service temperature of the gas to be measured an T is the absolute temperature.

In this connection, the correction of gas volumes from the service state, $p$, $T$ of the gas to be measured to the measurement state $p_o$, $T_o$ takes place according to the equation of state:

$$\frac{pV}{T} = \frac{p_o V_o}{T_o}$$

wherein $p$, V and T are the pressure, volume and tempera of the service gas to be measured and $p_o$, $V_o$ and $T_o$ are the pressure, volume and temperature of the measurement state.

Thus, $$V_o = V\left(\frac{p}{p_o} \cdot \frac{T_o}{T}\right)$$

wherein $$\frac{p}{p_o} \cdot \frac{T_o}{T}$$

may be designated the correction factor Z applied to the service gas volume measurement to obtain the corresponding standard volume of the measurement state.

Since the absolute pressure $p$ is either the sum of the barometric pressure $ba$ and the service guage pressure $p_u$ or the difference between the service guage pressure and an auxiliary pressure $p_u^+$ in functional relation with the barometric reading (i.e. $ba = p_o - p_u^+$), an since the absolute temperature T is the sum of the temperature of the measurement state $T_o$ and the service temperature $\delta$ whereby $$\frac{T_o}{T} = \frac{T - \delta}{T} = \frac{1 - \delta}{T} = 1 - R$$

the above equations may be derived.

The known device consists essentially in a pressure sum or difference computer coupled with an inclination balance, wherein the computor serves as the transmission means for the computing quantities mentioned and the inclination balance serves as the converter device for the measured quantities. It carries on its pendulum at least one control member with a curved rimmed aperture for the engagement of a detector or palpating member periodically actuated by the meter and the bordering curves of this aperture are determined empirically, so that the distance measured by the detector or palpating member between the two curved rims or edges in any position of the control member at a predetermined temperature stage represents a measure for the product of the existing computation quantity $(p_u + ba)/p_o$ or $(p_u - p_u^+)/p_o$ and a function of the temperature influence.

The known construction permits volume correction in a Z-range from about 0.8 to 2.1, for example between service pressures of about 1.5 to 3.7 atmospheres absol. at 0° C. or for example between 15 atmospheres absol. at 0° C. and about 42 atmospheres absol. at 30° C.

If it is desired in view of the expected increase in exigencies (measurement and volume reduction or correction with the highest pressures and pressure fluctuations), to design said known devices for Z-ranges greater than obtained till now, the dimensions required for the device serving as the control member would render difficult or impossible the achievement of simple constructional solutions.

Furthermore, in the known arrangement, the correction of the counting mechanism drive is only effected in connection with the separate palpating detections of the Z-value, namely only by jerks or spasmodically, the intervals between the separate palpations of the Z-value being determined by the rotational speed of the meter shaft, so that with decreasing rate of flow (=volume/time unit) the palpating detections occur less frequently, that is with smaller rates of flow, the detections of fluctuations of the specific gravity becomes less accurate than with larger ones.

It is possible by the present invention to increase considerably the Z-value range without constructional difficulties and to attain a continuous correction of the counting mechanism drive at a constant frequency of actuated detection palpations.

The invention likewise relates to a device for volume reduction or correction, in which the correction factor Z is produced by a mechanical computing device on the basis of the gas equation of state from the measured influence quantities converted into equivalent geometrical quantities used as the setting movement for a variable intermediate drive provided in the counting mechanism drive of the meter and the pressure influence is converted by means of a beam balance coupled with an inclination balance.

The novelty consists in that, in using the absolute service pressure as the single pressure quantity involved in the calculation, the corresponding geometrical measure for it is detected by palpating directly on the service pressure sensing balance beam and the mechanically induced constant oscillation stroke of the touching point (abutment, pin or the like) provided on the inclined detector member (lever) periodically abutting the balance beam is transformed by rectilinear guiding into the perpendicular of a right-angled triangle, the base of which has a length which is dependent upon and measured by the absolute service temperature sensed and the hypotenuse of which is given by the detector lever in its existing position, and in that the measure for the Z-value is determined by the perpendicular of a similar triangle, whose base, beginning at the pivot point of the detector lever, has an adjustable constant length.

To explain the invention, reference is made to the accompanying drawings, in which an embodiment of a volume reducing or correcting device operating according to the invention is shown diagrammatically.

A one-armed balance beam is indicated by 1, which rests at 2 upon a knife edge. Its free end is suspended from a steel band 3 which is taken over a drum, disc, roller or the like 4 of an inclination balance 4, 5, 6, pivoting about knife edge bearings 5, the other end of the band 3 being loaded by a weight 6'.

The balance arm 1 is loaded by the absolute service pressure $p$ ($=p_u+ba$), which is taken up at 7 by a knife edge bearing. The pressure $p_u$ is supplied by a pressure box 8 connected to the measuring duct A, with the movable base of which a co-axially arranged barometric box 9 is rigidly connected, so that the forces exerted by the two boxes are added together. A rigid support B serves for holding this box arrangement.

The moment thereby produced exerts on the free end of the balance arm 1 a force corresponding to the lever transmission ratio. This force is transmitted by the aforementioned band 3 to the inclination balance and produces at the axis of its pendulum 6 a moment of rotation which is determined by the diameter of the drum 4 and is compensated by the contrary moment of rotation of the pendulum 6 and the weight 6' (equilibrium).

The weight 6' is so chosen that it compensates a part of the total pressure, corresponding to the existing reduction or correction value Z, and acting upon the knife edge bearing 7. The choice is preferably so made that for any Z-value, e.g. in the range $Z=0.2$ to $0.5$ $Z_{max}$, the stroke of the pendulum 6 is equal to zero. This thereby ensures that this stroke for $Z_{max}$ always remains within limits in which the analytical and the sine values of the pendulum angle $\varphi$ differ only slightly from one another and a substantial simplification of the adjustment is given. A further advantage is that, with a total loading which is smaller than that which corresponds to the choice of the counterweight 6', the pendulum 6 is moved from its zero position towards the opposite side, namely for this side the difference between the analytical and sine values of the stroke angle becomes practically equal to zero. The inclination balance, despite the enlarged Z-range (=the sum of the positive and negative pendulum strokes), has no or only a negligibly slight sine error or, expressed conversely, the sine error is negligibly small, so that there is the possibility of a considerable enlargement of the Z-range.

The existing position of the balance beam 1 forms the measure, converted into a geometric quantity, for the absolute service pressure $p$, which is detected by a palpating lever or inclined rod 11 mounted at 10 and made to oscillate with adjustable time periods. The drive of the detector lever 11 is effected by a periodically acting tripping member (lever or the like) 12, which in the example shown is actuated by a crank drive or the like 13, 14 and wherein the crank shaft 13 is made to rotate by a constant drive (clockwork motor or the like) 15 independently of the number of revolutions of the gas meter.

At an appropriate position on the balance beam 1, an abutment 16 is provided, which is constructed for example as a rider and, as the countermember thereto, a pin or the like 17 is provided, which is secured to a slide member 19 which is linked to the detector lever 11 and is longitudinally or upwardly and downwardly movable in a rectilinear guide (rod) 18. In order to achieve this rectilinear guiding, the supported end of the detector lever 11 is constructed as a kind of fork or eyelet 20, which engages the pivot pin 10 and can move on it. The pivot pin 10 is provided on a sliding carriage or the like 21, which is adjustable in a tilt-free guide 22 perpendicular to the rectilinear guide 18 and whose adjustment is effected by the temperature indicator 23, 24, 24' of the volume correcting device.

A second rectilinear guide is indicated at 25, which is disposed in parallel arrangement with the rectilinear guide 18 on the sliding carriage 21 and rectilinearly or perpendicularly guides a rod or extension 27 carried by the detector lever 11 by means of a sleeve 26 which is longitudinally movable thereon. One of the ends of this rod 27 carries a bar-shaped abutment 28 arranged parallel to the tilt-free rail guide 22 for the one limb 30, provided with a detector head 29, of a crank lever 29, 30, 31 arranged with a tilting moment and constructed for carrying the bearing for the pole 32 of a friction wheel 33, wherein the tilting moment, indicated by an arrow, ensures its disposition against the abutment 28.

The detector head 29 is guided parallel to the two rectilinear guides 18 and 25 by a rectilinear guide. For this purpose (as shown only in the small side figure for simplicity) the carrier limb 30 is constructed as a sleeve, in which a shaft 34 carrying the detector head 29 is slidably mounted. The other end of this shaft 34 carries a sleeve 35 constructed as a T-piece, which is mounted on the connecting pin 36 of a pair of links 38, 39 pivotally mounted at 37, 37.

As the counter-member for the friction wheel 33, a cone 40 known in friction wheel drives is employed, whose axis 41 is inclined, preferably such that the surface line serving as the track for the friction wheel lies horizontal, and which receives its drive by way of a gear train (not shown) from the shaft of the meter C. 42 is the support bearing of the cone shaft. The friction wheel 33 is mounted in a frame 44, which is pivotable about an upright pin 43, whereby the pivot axis (considered extended) lies perpendicular to the track of the friction wheel at the contact point between the friction wheel and the cone.

The pin 43 is rotatably mounted in a carrier, sliding carriage or the like 45, which is guided parallel to the track of the friction wheel 33, and preferably at the height of the friction wheel shaft 47, in a freely-moving horizontal guide (whose rollers are omitted from the drawing for reasons of simplicity). The frame 44 also carries the reductor counting mechanism 48 which is driven from the shaft 47 via a pair of wheels 49, 50 and which indicates the volumes reduced to normal cubic metres. The counting mechanism 48 thus takes part in all longitudinal movements of the frame 44. An elongated window 51, arranged in the housing of the volume reductor parallel to the guide 46 and shown in the drawing with chain-dotted lines, permits readings to be made in any position. The counting mechanism 52 associated with the meter C indicates the measured volumes in service cubic metres.

Concerning the operation of wheel 33, it will be appreciated that since crank lever 29, 30, 31 pivots about pivot axis 70 so that pole 32 carrying wheel 33 will move along the surface of cone 40 in the longitudinal direction of the cone surface, at no time will wheel 33 be removed from frictional contact with the surface of cone 40. Instead, the ratio of revolutions of friction wheel 33 with respect to cone 40 will change as pole 32 is moved toward or away from the apex of cone 40 by movement of arm 31 of the crank lever. Obviously, as arm 31 moves pole 32 towards the apex of cone 40, wheel 33 will make frictional contact with a correspondingly decreasing diameter surface of cone 40. Of course, as arm 31 moves in the opposite direction, a larger diameter surface will be encountered by wheel 33 and, accordingly, the number of revolutions of wheel 33 will increase with respect to the number of revolutions of cone 40. Depending upon the number of revolutions of wheel 33, a correction factor is introduced by means of shaft 47 and mechanism 48.

In order to prevent the balance beam 1, which at the moments of Z-value detection is in the equilibrium position, from being brought by the detector head 17 out of equilibrium (i.e. from giving place), and thereby incurring a measuring error, a braking device is provided, by which the disc 4 is locked from movement during the instants of detection palpation.

For this purpose, a second disc 53 is provided on the shaft 13 of the crank member 14, which carries on its circumference, namely in a sector corresponding to the crank member 14, a series of cam teeth 54. This disc 53 and its cam teeth 54 co-operate with a rod, plunger or the like 56 guided at 55, which is connected at 57 to a brake lever 60 pivotally mounted at 58 and under the action of a return spring 59.

As long as the trip lever 12 carried upon the crank member 14 is in its highest position, the cam teeth 54 (their shape and mutual spacing being chosen as required) successively co-operate with the rod 56 and lift it, whereby each time the brake pad 61 of the lever 60 is lifted for an instant from the disc 4. The pendulum 6 thus has time to set up or adjust itself. This setting up is caused because of the above-mentioned drive of the shaft 13 by the motor 15 independently of the rotational speed of the meter shaft 41, i.e. independently of the gas throughput through the meter C. In this way, an increased measuring accuracy is achieved, which is the greater the greater the rotational speed of the shaft 13 is chosen. In the region between the cam teeth 54 and in the cam free-region, the disc 4 is continuously locked.

A further important purpose and advantage of this intermittently-functioning brake device consists in that by it, on oscillations of the pendulum system, e.g. with varying pressure conditions, the equilibrium position (due position for palpating detection) is re-established rapidly and the correctness of this position is controlled by the subsequent braking impulses and releases. Since with this mode of operation any hysteresis effect is excluded, the achievement of the correct equilibrium position for the detection is always ensured, it being immaterial whether the pendulum resetting is effected with increasing or decreasing loading. The pendulum position corresponding to the existing absolute pressure is thus always definitely defined and therefore always reproducible, as is prescribed by the official gauging regulations. The described braking device is an essential feature for the construction of a volume reducing device operating according to the invention.

The carrier 29, 30, 31, which by means of the detector head 29 has to hold fast the position of the member 28 coordinated to the detecting position between the members 16 and 17, is likewise provided for this purpose with a brake device. This consists of a further cam disc 62, 63 provided on the shaft 13. By way of a push rod 64, cam 63 controls a two-armed lever 67, 68 pivotally mounted at 65 and maintained under the action of a return spring 66. A brake member 69 is provided on the arm 68 of the lever, which co-operates with an arcuate member 71 secured to the carrier coaxially with its pivot axis 70 and to which it moves radially.

Thus, the brake mechanism, including elements 62 to 71, is used to hold intermittently wheel 33 at a given position, and upon intermittent releasing of the brake mechanism the butment 28 of rod 27 engages detector head 29 of the crank lever to readjust the position of wheel 33. On the other hand, the actual adjustment of pressure and temperature is carried out with respect to detector lever 11 intermittently by means of the mechanism 12, 13, 14 in conjunction with the brake mechanism, including elements 53 to 61.

To permit full understanding, it is assumed in the further explanation that the crank member 14 moves clockwise and happens to be in the upper part of its travel, in which part as mentioned it holds the trip lever 12 in its upper end position. This position is so chosen that it corresponds to a reduction factor Z which is smaller than the lower limit $Z_{min}$ of the desired reduction range.

The opposite dead point position is so chosen that the trip lever 12 is moved further downwards than is necessary for the desired $Z_{max}$ value of the reduction range. Also, the arrangement is such that, for the time during which the lever 12 is located beyond the position corresponding to $Z_{max}$, i.e. beyond the upper reduction range limit, the cam 63 holds the brake device 69, 70 in a free position.

If the detecting stroke of the balance beam 1 (e.g. with decreasing service pressure $p_u$) becomes smaller (upward movement of the abutment 16), the rod 27 can follow the upward movement with its abutment 28, since the locked detector head 29 is always in a position below the abutment 28, until the detector lever 11 is moved by the crank drive 13, 14 into its uppermost position and the pendulum 6 and with it the abutment 16 become set up in the new detecting position and, as stated, become locked.

If the detector lever 11 now sinks on further rotation of the crank drive 13, 14, until its pin 17 contacts the abutment 16, the detector lever 11 remains in this position due to the afore-mentioned locking of the pendulum 6, but the cam 63 on the disc 62 releases the brake device 69, 71 and the detector head 29 of the carrier 29, 30, 31 moves up to the abutment 28 because of the tilting moment described.

If with increasing pressure the Z-value becomes greater, the detector lever 11 is first likewise brought into its highest position, wherein the pendulum 6 moves into the position which corresponds to the new Z-value and is then locked. If then, on the further rotation of the crank drive 13, 14, the detector lever 11 is again moved downwardly, it can continue this movement only as long as the abutment 28 settles on the already locked detector head 29 of the carrier. It does not attain the position which is coordinated to the new Z-value. As soon as the crank shaft 13, 14 in its travel passes below the position which corresponds to the $Z_{max}$ value, the cam 63 releases the brake 69, 71 and, under the load of its own weight and that of the driving mechanism connected with it, the detector lever 11 falls until its pin 17 contacts the abutment 16. The abutment 28 thus moves the now released carrier 29, 30, 31 into the new position, by way of the detector head 29.

From the above, it will be seen, that, with any operative play of the detector device, i.e. with any rotation of the shaft 13, the contact point between the pole 32 of the friction wheel 33 and the arm 31 of the carrier is brought into a position coordinated to the existing gas state and the corresponding Z-value, wherein the friction wheel necessarily runs into the track line of the contact point due to to the cone rotation.

In the above, merely for easier explanation, relatively coarse state alterations of the gas to be measured were assumed. In practice, however, as is known, they run always quite gradually, because of the large capacity of pipe networks and since, according to the above statement, the friction wheel takes up its due position virtually without delay, the transmission ratio set by the friction wheel drive despite the intermittent mode of operation of the palpating pressure detection, is likewise practically proportional at any moment to the actual Z-value. Thus a conversion of the rhythmic Z-value detection into an equivalent continuous shaft rotation of the normal cubic metre counting mechanism 52 takes place, so that with volume reducing devices which operate according to the invention the usual electrical measuring value transmission devices are utilizable immediately.

As can be clearly seen from the drawing, the geometrical quantity equivalent to the pressure influence forms one of the perpendicular sides and that equivalent to the temperature influence forms the other of the perpendicular sides of a right-angled triangle, whose hypotenuse is given by that respective section of the detector lever 11 which lies between the pivot pin 10 and the guide member 19 rectilinearly guided at 18.

The tangent of the stroke angle of the detector lever 11 at the pin 10 is thus an exact measure for the quotients $P/T$ of the absolute service pressure and the absolute service temperature and hence an exact measure for the reduction factor Z. According to the rules of trigonometry, the setting movement of the rod 27, which is rectilinearly guided at a predetermined desired distance from the pivot pin 10 parallel to the rod 18, and hence the setting movement of the abutment 28, is thus an exact measure for the reduction factor Z.

Summarizing, therefore, with respect to the overall control of wheel 33 by shaft 27, it can be said geometrically that the temperature equivalent leg of a right triangle may be considered as extending in horizontal direction while the pressure equivalent leg may be considered as extending in vertical direction whereby lever 11 forms the hypotenuse. As is known, the ratio of $P/T$ or $T/P$ represents the tangent of such right triangle. Any change in the value of P or T (caused by a change in the length of the corresponding leg of the right triangle) will correspondingly cause a change in the tangent ratio. By providing shaft 27 connected to lever 11, the changes in the tangent ratio effected in accordance with the foregoing will be simultaneously transmitted into linear movement of shaft 27 so as in turn to control the position of wheel 33 with respect to cone 40. Certainly, if carriage 21 moves to the right (as viewed in the drawing), the angle between elements 11, 10 and 21 will increase and thereby cause an upward movement of shaft 27. On the other hand, if carriage 21 moves to the left, the opposite result will occur. Coupled with this operation, if a change in pressure causes pin 17 to move downwardly thereby increasing the pressure leg of the right triangle, similarly increasing the angle between the elements 11, 10 and 21, shaft 27 will execute a downward movement. In the same way an upward movement of pin 17 caused by a corresponding pressure change will in turn cause an upward movement of shaft 27.

Thus, various possibilities are present. For example, an increase in temperature may be accompanied by an increase in pressure; an increase in temperature may be accompanied by a decrease in pressure; a decrease in temperature may be accompanied by a decrease in pressure; and a decrease in temperature may be accompanied by an increase in pressure. Accordingly, the position of shaft 27 may occur within the broad area of a plane generally passing through lever 11, guide rod 18 and guide 22.

In the singular manner of the invention, the tangent ratio achieved, i.e. the quotient obtained by resolving the linear quantities of pressure and temperatures sensed by triangulation, is applied as a measure of linear movement in representing a correction factor in the measurement of the service volume of the gas. It is pointed out that such triangulation is carried out with adjusting linear quantities spatially related in right angle form, whereby the resolved ratio of triangulation is translated into linear movement simultaneously with changes in said ratio and applied as a correction factor in the normal way for the counting mechanism 52 indicating the cubic meters of gas flowing through the conduit. The correction factor is applied actually to counting mechanism 48 which may, for example, indicate the gas measurement at 0° C. and 760 Torr reduced to normal cubic meters. The correction is achieved in practice mechanically for the counting mechanism 48 by the adjustable apparatus which varies the transmission between cone 40 and wheel 33 so that the normal cubic meter indication may be obtained at counting mechanism 48, inasmuch as the service pressure and service temperature sensed are placed in a quotient relationship and the geometrical equivalent thereof is applied as a volume correction factor Z, specifically traced to the linear movement of the rod 27 which is directly proportional to the tangent ratio or quotient $P/T$.

In the drawing, to achieve simplicity in the representation, the vertical distance between the rectilinearly guided rod 27 and the pivot pin 10 appears as an invariable quantity. In practical constructions, to obtain the possibility of adjustment in the sliding carriage 21, a device for longitudinal adjustment, e.g. similar to an arrestable telescopic tube, micrometer screw or the like, is provided.

The realisation of the invention is not limited to the particular embodiment described above and illustrated in the drawing, but can be modified in a number of ways. For example, in those cases in which a disc (that is, a cone of zero height) is employed as the counter member for the friction wheel, the guiding of the friction wheel carirage is arranged substantially radially of the disc or parallel to its radius.

Further modifications are given by the choice of equivalent constructional means, e.g. if instead of the weight which serves for producing the counter moment to the inclination balance, a spring is used or, instead of the mechanical actuation of the brake devices, an electromagnetic device with control by contacts is chosen.

I claim:

1. A volume correction device used for correcting the measurement by a measuring device of a gas flowing through a conduit which comprises a balance beam mounted for pivotal movement and having a free end portion, said end portion being normally urged in one direction by urging means, means responsive to barometric pressure and means responsive to the service pressure of the gas, the service pressure means and the barometric pressure means being connected for exerting a resultant sum of responsive force against said beam at a point intermediate the pivot of said beam and said free end portion in a direction opposite to that at which said free end portion is normally urged, means responsive to the absolute service temperature of the gas connected for linear movement of a pivot point means along a line above and substantially parallel to the longitudinal axis of said beam, an inclined rod pivotally mounted at its upper end on said pivot point means and slidable in the direction of its axis along said pivot point means and pivotally mounted at its lower end on a support, said support being linearly slidable in a direction substantially perpendicular to the longitudinal axis of said beam, a stop positioned on said support adapted to engage said beam at its free end portion in a direction opposite to that at which said beam is normally urged, said rod carrying an extension thereon guided for linear travel, said extension being connected to means defining a correction intermediate drive means for a gas volume measuring device for said gas.

2. A volume correction device according to claim 1 wherein are provided means for intermittently upwardly urging the lower end of said rod, first brake means for releasably engaging said urging means, said first brake means being adapted to be released upon the intermittent upward urging of the lower end of said rod, and second brake means for releasably engaging said correction intermediate drive means, said second brake means being adapted to be released when said first brake means for said urging means are in braking engagement, said second brake means being for adjustment during the release from engagement of the correction intermediate drive means.

3. A volume correction device according to claim 2 wherein said correction intermediate drive means includes a pivotally mounted angle bracket normally urged in one direction, one arm of said bracket linkably connected to a friction wheel pivotable carriage, the other arm of said bracket being connected with said extension, the friction wheel of said carriage being in balanced frictional contact with a revolving conical surface connected to a gas measuring drive, the rotations of said wheel being registered by a counting device.

4. A volume correction device according to claim 3 wherein the other arm of said bracket is releasably connected to said extension.

5. A volume correction device according to claim 4 wherein the brake means for said correction intermediate drive means are positioned to engage said bracket arm.

6. A volume correction device for correcting the measurement by a measuring device of a gas flowing through a conduit which comprises a normally horizontal balance beam mounted on a beam pivot for pivotal movement and having a free end, said end being urged in one direction by urging means, means responsive to barometric pressure and the service pressure of the gas connected for exerting a resultant sum of responsive force against said beam in the opposite direction at a point intermediate the pivot of said beam and said free end, means responsive to the absolute service temperature of the gas connected for linear movement of a pivot point means along a line above and normally parallel to the beam, an inclined rod pivotally mounted at its upper end on said pivot point means and being capable of being longitudinally displaced with respect to said pivot point means, said rod being pivotally mounted at its lower end on a vertically displaceable support, a stop positioned on said support adapted to engage said beam in said opposite direction, an extension disposed on said rod guided for linear travel in a direction substantially perpendicular to the longitudinal axis of said beam, said extension being linked to correction intermediate drive means for a gas volume measuring device for said gas, means for intermittently upwardly urging the lower end of said rod, and first braking means for intermittently braking said urging means and second braking means for intermittently braking said correction intermediate drive means, said first braking means being adapted to be released upon the intermittent upward urging of the lower end of said rod and said second braking means being adapted to be released when said first braking means are in braking engagement with said urging means, said second braking means being for adjustment during the release from engagement of the correction intermediate drive means and the simultaneous braking engagement of said urging means by said first braking means.

References Cited in the file of this patent

UNITED STATES PATENTS

| | | |
|---|---|---|
| 1,303,443 | Wohlenberg | May 13, 1919 |
| 1,881,572 | Herz | Oct. 11, 1932 |
| 1,947,370 | Zoll | Feb. 13, 1934 |
| 2,052,764 | Harrison | Sept. 1, 1936 |
| 2,059,547 | Brandl | Nov. 3, 1936 |
| 2,159,882 | Borden | May 23, 1939 |
| 2,203,789 | Johnson | June 11, 1940 |
| 2,222,551 | Ziebolz et al. | Nov. 19, 1940 |
| 2,223,705 | Roudnicky | Dec. 3, 1940 |
| 2,477,233 | Bristol | July 26, 1949 |
| 2,491,548 | Branson | Dec. 20, 1949 |
| 2,497,431 | Beman | Feb. 14, 1950 |
| 2,601,777 | Woodward | July 1, 1952 |
| 2,662,757 | Mock | Dec. 15, 1953 |

FOREIGN PATENTS

| | | |
|---|---|---|
| 742,648 | Great Britain | Dec. 30, 1955 |